United States Patent
Vemulapati et al.

(10) Patent No.: US 10,303,673 B2
(45) Date of Patent: May 28, 2019

(54) HIERARCHICAL DATA STORAGE

(71) Applicant: Apple Inc., Cupertino, CA (US)

(72) Inventors: Murali Vemulapati, Cupertino, CA (US); James Qiu, Santa Clara, CA (US); Frank Lu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 872 days.

(21) Appl. No.: 14/833,015

(22) Filed: Aug. 21, 2015

(65) Prior Publication Data

US 2016/0335299 A1    Nov. 17, 2016

Related U.S. Application Data (60) Provisional application No. 62/159,921, filed on May 11, 2015.

(51) Int. Cl.
*G06F 16/22* (2019.01)

(52) U.S. Cl.
CPC ...... *G06F 16/2246* (2019.01); *G06F 16/2291* (2019.01)

(58) Field of Classification Search
CPC ......... G06F 17/30327; G06F 17/30342; G06F 16/2246; G06F 16/2291
USPC ...................................................... 707/743
See application file for complete search history.

(56) References Cited

U.S. PATENT DOCUMENTS

| | | | | |
|---|---|---|---|---|
| 5,852,822 A * | 12/1998 | Srinivasan | .......... | G06F 16/2246 |
| 6,144,983 A * | 11/2000 | Klots | ........................ | G06F 9/52 |
| | | | | 707/999.008 |
| 6,694,323 B2 | 2/2004 | Bumbulis | | |
| 7,970,769 B2 * | 6/2011 | Kang | ................ | G06F 17/30327 |
| | | | | 707/741 |
| 8,700,670 B2 * | 4/2014 | Marathe | ............ | G06F 17/30958 |
| | | | | 707/794 |
| 2005/0102255 A1 * | 5/2005 | Bultman | .......... | G06F 17/30327 |
| 2008/0086470 A1 * | 4/2008 | Graefe | .............. | G06F 17/30327 |
| 2010/0082545 A1 * | 4/2010 | Bhattacharjee | ....... | G06F 16/328 |
| | | | | 707/641 |
| 2013/0290384 A1 * | 10/2013 | Anderson | ......... | G06F 17/30091 |
| | | | | 707/822 |
| 2015/0293958 A1 * | 10/2015 | Chen | ................... | G06F 16/2246 |
| | | | | 707/797 |

* cited by examiner

*Primary Examiner* — James Trujillo
*Assistant Examiner* — Jessica N Le
(74) *Attorney, Agent, or Firm* — Dickinson Wright RLLP (57) ABSTRACT

System, method, and computer program product key compression and cached-locking are described. A computer system can store database files or operating system files in a tree data structure. The system can store data or metadata as key-value pairs in nodes of the tree data structure. The keys in the key-value pairs can have a hierarchical structure, which may or may not correspond to the tree data structure. The system can compress the keys by reducing duplicated storage of shared portions of the keys. The system can use an index in a tree node to represent the hierarchical structure of the key-value pairs stored in that tree node. To access a value in a key-value pair, the system can identify the tree node to search, query the index in that tree node to locate the value, and then access the value at the indexed location.

22 Claims, 6 Drawing Sheets

HIERARCHICAL DATA STORAGE

CROSS-REFERENCE TO RELATED APPLICATION

This application claims priority to U.S. Provisional Patent Application No. 62/159,921, entitled "Hierarchical Data Storage," filed May 11, 2015, the entire contents of which are incorporated herein by reference.

TECHNICAL FIELD

This disclosure relates generally to database file storage.

BACKGROUND

Many database systems or operating systems use a B-tree or B+ tree data structure to store data or metadata. A B-tree or B+ tree allows data access including searches, insertions and deletions in logarithmic time (O(log n)), where n is number of nodes in the tree. A B-tree or B+ tree can have leaf nodes that have no child nodes and internal nodes that have child nodes. A B-tree or B+ tree can have a root node having one or more child nodes and no parent node. The data or metadata can include key-value pairs.

SUMMARY

Techniques for key compression are described. A computer system can store database files or operating system files in a tree data structure such as a B-tree or B+ tree. The system can store data or metadata as key-value pairs in nodes of the tree data structure. The keys in the key-value pairs can have a hierarchical structure. The system can compress the keys by reducing duplicated storage of shared portions of the keys. The system can use an index in a tree node to represent the hierarchical structure of the key-value pairs stored in that tree node. To access a value in a key-value pair, the system can identify the tree node to search, query the index in that tree node to locate the value, and then access the value at the indexed location.

Techniques of cached-locking are described. The computer system can reduce locking when accessing values in the tree data structure. Instead of performing a search from the root node of a tree structure and locking and unlocking nodes in the search, the system can perform a search in a cached node. The system can then search from the root only if result of the search in the cached node indicates that the searched content is not in the cached node but may exist in another node.

The features described in this specification can achieve one or more advantages. Compared to conventional techniques of storing data or metadata in a tree data structure, the key compression techniques described in this specification reduce the amount of data stored by reducing duplication. Commonly used components in the key may be stored only once. Compared to conventional B-tree or B+ tree traverse algorithms, the cached-locking techniques described in this specification reduce the number of locks performed. In particular, the cached-locking techniques reduce locking of an entire tree. Accordingly, the techniques allow more concurrent accesses to a database file or to an operation system file. The key compression and cached-locking techniques can reduce time for accessing data from O(log n) to O(1) in some cases. The technologies described in this specification can be advantageously applied in database systems and operating systems.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

Like reference symbols in the various drawings indicate like elements.

DETAILED DESCRIPTION

Exemplary Tree Data Structure

Figure 1:
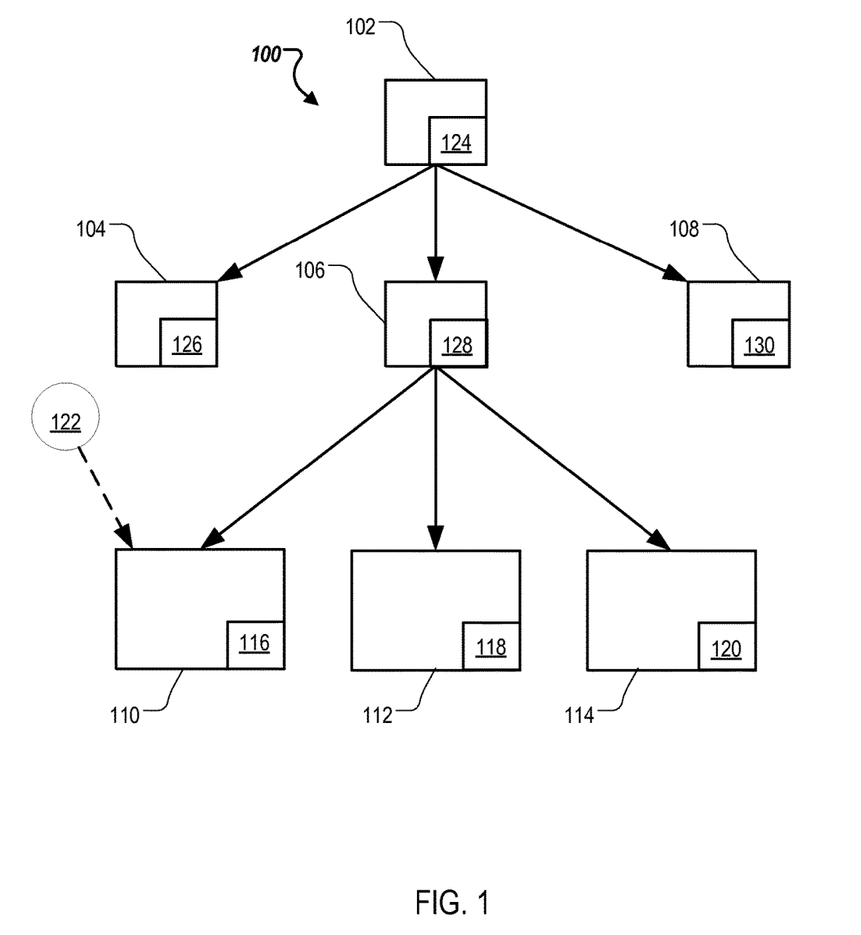
FIG. 1 is a diagram illustrating an example tree data structure for key compression and cached-locking.

FIG. 1 is a diagram illustrating example tree data structure 100 for key compression and cached-locking Tree data structure 100 can be a database file or operating system file. Tree data structure 100 can be a B+ tree having multiple nodes, also referred to as pages. The nodes can include root node 102. The B+ tree can have internal nodes 104, 106 and 108, and leaf nodes 110, 112 and 114. In the example shown, each of internal nodes 104, 106 and 108 is a child of root node 102. Each of leaf nodes 110, 112 and 114 is a child of internal node 106. Each of leaf nodes 110, 112 and 114 has no child. Each of nodes 102, 104, 106, 108, 110, 112 and 114 can correspond to a storage page in memory or on disk. Each of the nodes can have a pre-defined and configurable size, e.g., four kilobytes (4 KB). Each of leaf nodes 110, 112 and 114 can store content of the database file or operating system file. The content can include one or more key-value pairs. The keys may be sorted. The one or more key-value pairs can have a key range that is defined by a smallest key in the one or more key-value pairs and a largest key in the one or more key-value pairs.

In a conventional tree data structure that stores key-value pairs, each time a processor accesses values stored in a leaf node, a processor may need to traverse the tree by starting from a root until the processor reaches a leaf node. In tree data structure 100, each of leaf nodes 110, 112 and 114 can store one or more key-value pairs. The keys in the one or more key-value pairs can be compressed, where shared components of a key needs not be stored repeatedly. Each node of tree data structure, including leaf nodes 110, 112 and 114 can include a respective index for accessing the compressed keys. The indices for leaf nodes 110, 112 and 114 are designated as slot tables 116, 118 and 120, respectively. Each of slot tables 116, 118 and 120 can store references to key-value pairs in leaf nodes 110, 112 and 114, respectively. The indices for nodes 102, 104, 106 and 108 are designated as slot tables 124, 126, 128 and 130, respectively.

In storing the keys in the nodes, the processor can compress the keys by breaking each key into sections. Each section can be designated as a sub-key. The processor can index sub-keys that are shared among multiple keys. The processor can store each sub-key at a location in each leaf node 110, 112 or 114. The processor can store an index of the sub-keys in slot tables 116, 118 and 120. The index can include locations of the sub-keys. Accordingly, slot tables 116, 118 and 120 can reduce the need for storing each key.

The processor can compress the value using a conventional compression technique. Compressing the key in addition to the value can result in additional saving storage space.

The processor can access a stored value using a query key. The processor can generate the query key response to a database query (e.g., a database statement of INSERT, UPDATE or DELETE with a WHERE clause). The database query can target a database file stored as tree data structure 100. To access data, the processor can generate the query key based on the database table to access, rows in the database table, and fields in the row. The processor can then access the value corresponding to that query key. To reach the value corresponding to the query key, the processor can traverse tree data structure 100 to reach a particular leaf node, (e.g., leaf node 110) using a portion of the query key. The processor can then perform a lookup in the index stored in slot table 116 using another portion of the query key to locate the value.

The processor can improve the speed of search for the value by accessing leaf node 110 directly before traversing tree data structure 100 from root node 102. To locate a value stored in a tree, a conventional system can traverse the tree from a root. Using cached-locking techniques, the processor can access a previous visited leaf node using information cached in an anchor. For example, anchor 122 can store information on where a previous visit occurred. The information can include an identifier, a reference or a pointer of a node previously visited. For example, anchor 122 can store a pointer to leaf node 110. In addition, the information can include an identifier, a reference or a pointer to a location in slot table 116 that was last used.

The processor can visit leaf node 110 using the information stored in anchor 122 before performing a search from root node 102 using the query key. Visiting leaf node 110 using the query key may have various results. The visit may find the value corresponding to the query key. The visit may find that the query key, although in range of keys stored in leaf node 110, does not exist. In both cases, the visit can be designated as a success. The processor does not need to traverse tree data structure 100 from root node 102.

The visit may find that the query key is not in range of keys stored in leaf node 110. In this case, the processor can traverse tree data structure 100 from root node 102 to find the node where the query key belongs. Since traversing the tree occurs only conditionally when the query key is not in range, fewer locking of tree data structure 100 needs to occur, and complexity of operation can be reduced from O(log n) for traversing tree data structure 100 to O(1) for direct accessing leaf node 110.

Exemplary Key Hierarchy

Figure 2:
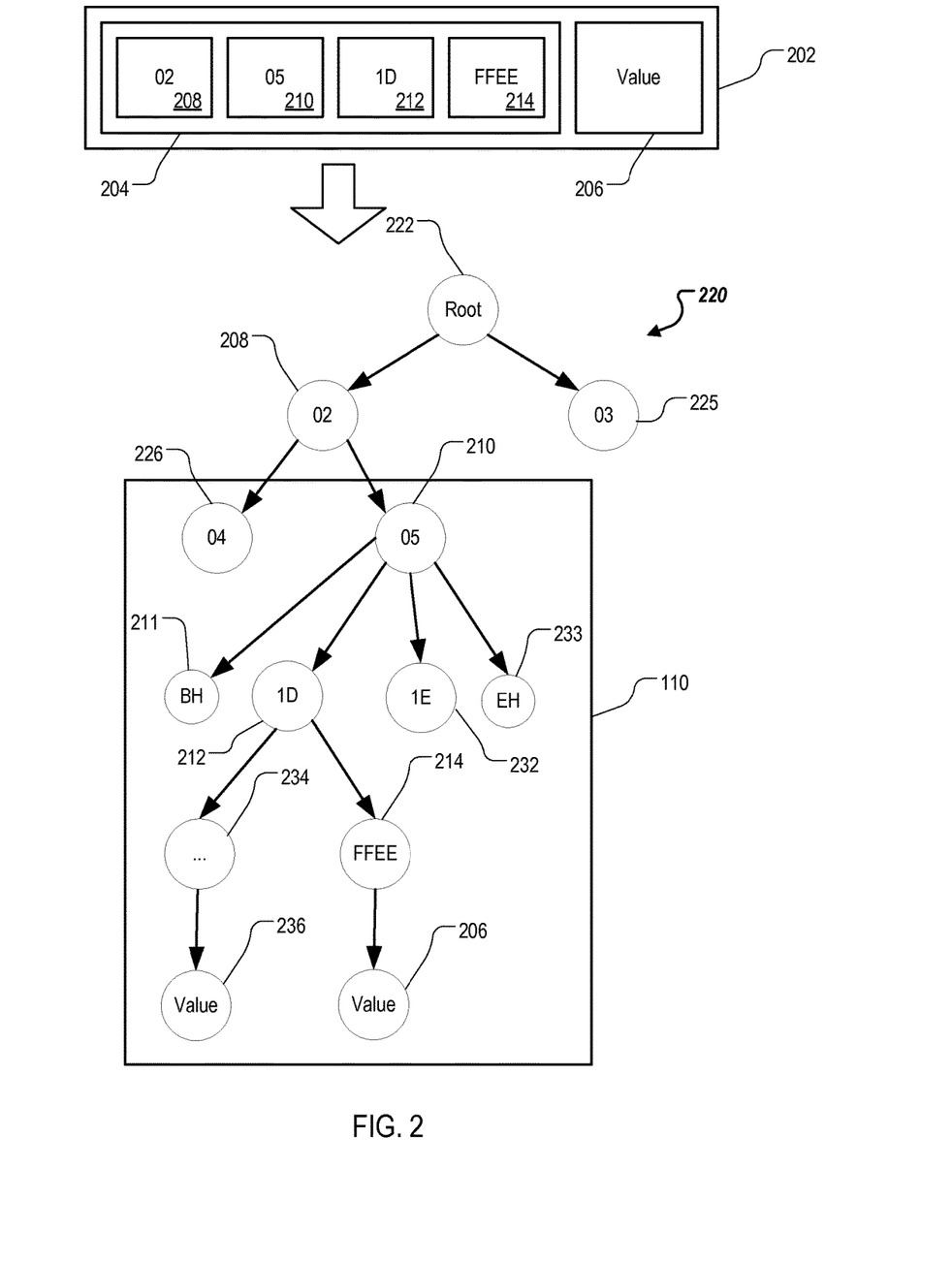
FIG. 2 is a diagram illustrating an example hierarchical key.

FIG. 2 is a diagram illustrating an example hierarchical key. Example key-value pair 202 can be a key-value pair stored in tree data structure 100 (of FIG. 1). Key-value pair 202 can include key 204 associated with value 206. Value 206 can be various content stored in a database. The content can include, for example, a string, binary data, multimedia data or other forms of data that can be stored or referenced in a database table. Key 204 can have multiple sub-keys 208, 210, 212 and 214.

Each of non-terminal sub-keys (e.g., sub-key 208, 210 and 212) can have only other sub-keys as children. Each terminal sub-key (e.g., sub-key 214) can have a respective associated value. For example, key 204 can be represented as 02.05.1D.FFEE, where the "." is a separator for convenient notation. Each of the 02, 05, 1D and FFEE can be a hexadecimal number.

Sub-keys 208, 210, 212, and 214 can have a hierarchy based on relative location between them. A sub-key located to the left can have a higher level in the hierarchy. In the example shown, each of sub-keys 208, 210, 212 and 214 can be associated with a respective sub-key level. From left to right in key 204, sub-keys 208, 210, 212 and 214 can have levels one, two, three and four, respectively. A sub-key corresponding to level i+1 is a child of a sub-key corresponding to level i. A sub-key corresponding to level i is a parent of a sub-key corresponding to level i+1.

The levels of sub-keys 208, 210, 212 and 214 are represented in hierarchical key structure 220. Hierarchical key structure 220 is a data structure that is different from tree data structure 100 of FIG. 1. Hierarchical key structure 220 can be a tree having a root 222. Root 222 can be an empty sub-key located at level zero.

Hierarchical key structure 220 can have a next level, level one, including sub-keys 208 and 225. The value of sub-key 208 may be shared by many keys, including all keys in a database file that have a first section having this value. Unshared portions of these keys are represented as sub-trees of sub-key 208. These include sub-keys 226 and 210. Sub-keys 226 and 210 can be in a next level, level two.

At each level, including level one and level two, sub-keys having a same parent can be grouped into a set. In each set, sub-keys are ordered from small to large. In addition, in some implementations, a special sub-key designated as begin hierarchy (BH) is added. The BH key is smaller than all other sub-keys in the level. A special sub-key designated as end hierarchy (EH) is added. The EH key is larger than all other sub-keys in the level.

A smallest sub-key in a level that is a child of the parent can be referred to as a left most child (or first child) of the parent in that level. A largest sub-key in a level that is a child of the parent can be referred to as a right most child (or last child) sub-key of the parent in that level. In this example, the second level sub-key 210 ("05") has two child sub-keys 212 and 232 ("1D" and "1E"). BH key 211 and EH key 233 are added. BH key 211 and EH key 233 can be the left most child and right most child of sub-key 210, respectively.

Sub-key 210 can have child sub-keys 212 and 232. Each of sub-keys 212 and 232 can be on a third level in hierarchical key structure 220. Sub-key 210 can have child sub-keys 234 and 214. For example, fourth level sub-key 214 ("FFEE") has value 206. Fourth level sub-key 234 can have a value 236. Value 206 corresponding to an example key "02.05.1D.FFEE" can have any data value.

Leaf node 110 of tree data structure 100 can store key-value pair 202 as well as one or more other key-value pairs that are represented by children of sub-key 208. The key-value pairs stored in leaf node 110 can include those key-value pairs having keys starting from the value (in this example, 02) of sub-key 208. The number of key-value pairs stored in leaf node 110 can be limited by a size of leaf node 110, a size of each key and a size of each value. Additional details on structure of leaf node 110 are described below in reference to FIG. 3.

Exemplary Slot Table

Figure 3:
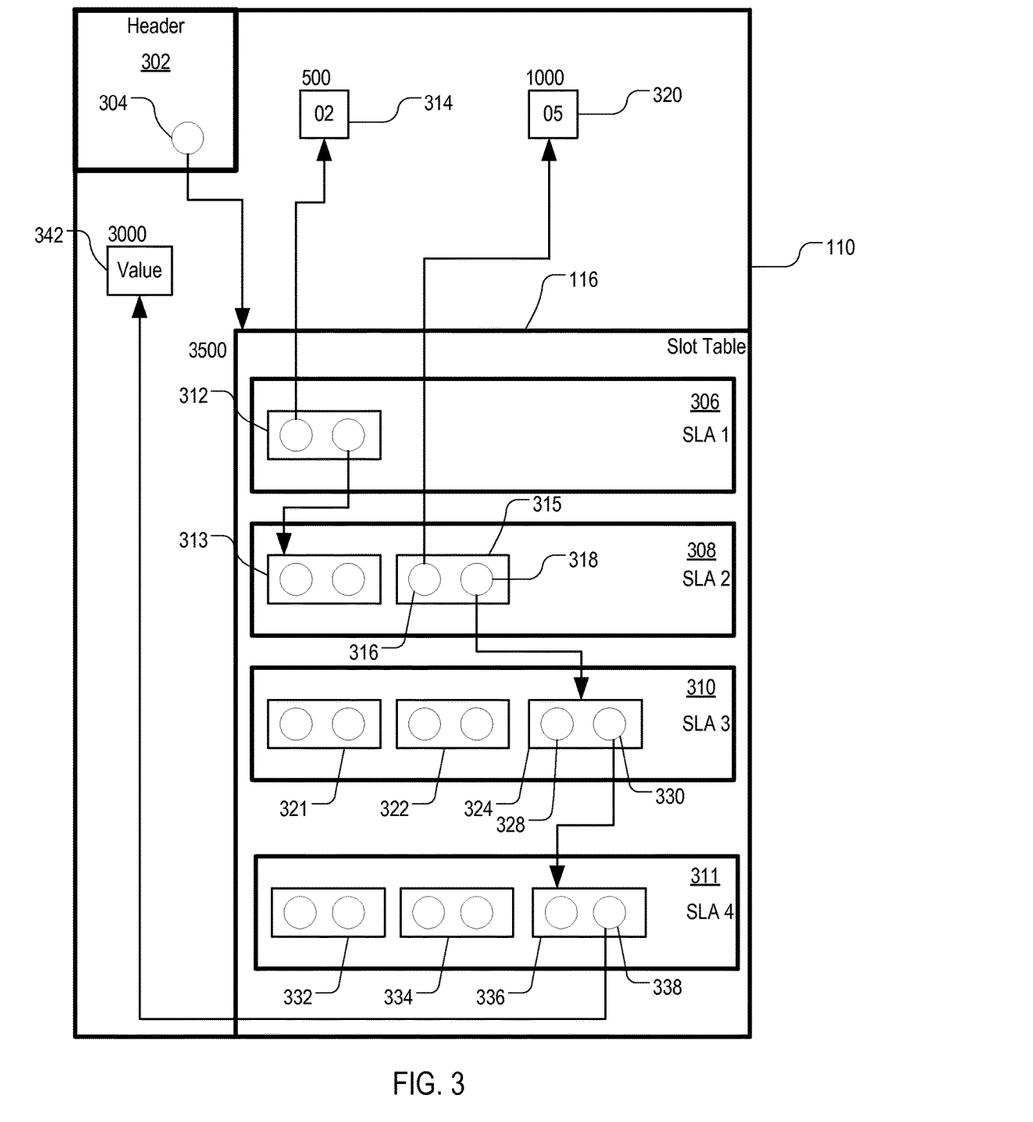
FIG. 3 is a diagram of structure of an example node in the example tree data structure.

FIG. 3 is a diagram of structure of example node 110 in example tree data structure 100. Node 110 can include header 302, storage space for storing key-value pairs include key-value pair 202 of FIG. 2. Node 110 can include slot table 116.

Header 302 can store information that corresponds to structure of tree data structure 100. This information can include, for example, an identifier, a reference, or a pointer to a parent node of node 110; an identifier, a reference, or a pointer to a left neighbor of node 110; and an identifier, a reference, or a pointer to a right neighbor of node 110. The structure of tree data structure 100 is different from a structure of hierarchical key structure 220. Header 302 can store slot table offset 304. Slot table offset 304 can indicate a location where slot table 116 is located inside node 110. The location can be an offset (e.g., 3500) in bytes from a beginning of node 110.

Slot table 116 can be a data structure having multiple levels. Each level can be an array containing information about one level of sub-keys. Each element of the array can include a data tuple storing information about a sub-key. Each element can be designated as a slot. Each array can be designated as a slot level array (SLA).

For example, slot table 116 can have first SLA 306, second SLA 308, third SLA 310 and fourth SLA 311. Each SLA in slot table 116 can correspond to a level in a key (e.g., key 204) in a key-value pair that is stored in node 110 where slot table 116 is located. For example, first SLA 306 can correspond to a first level including the first sub-key 208 of key 204. Second SLA 308 can correspond to the second level including sub-key 210 of key 204. Third SLA 310 can correspond to the third level including third sub-key 212 of key 204. Fourth SLA 311 can correspond to the fourth level including fourth sub-key 214 of key 204.

Each SLA may store multiple slots. Each slot can be a tuple including one or more data items. Each tuple can represent a sub-key. For example, SLA 306 of slot table 116 can store slot 312. Slot 312 can correspond to the first level sub-key. The first level sub-key can include sub-key 208 of key 204. Slot 312 can include data items including a first reference and a second reference. The first reference can include a page offset (e.g., 500 bytes) in node 110 of location 314 where the sub-key is stored. The second reference can refer to a location of left most child of the sub-key in node 110 as represented in the next level. The left-most sub-key may or may not be a BH key because node 110 may store only a portion of the sub-tree under sub-key 208 that does not include the smallest child of sub-key 208. The location can be an index, e.g., first, second, third. In this example, the next level corresponds to SLA 308. In the example shown, the left most child of sub-key of slot 312 is represented by slot 313. Accordingly, the second reference of slot 312 can point to a location of slot 313 in SLA 308.

SLA 308 of slot table 116 can store slots 313 and 315. Slots 313 and 315 can represent sub-keys 226 and 210 (of FIG. 2), respectively. Each of slots 313 and 315 can include a first reference and a second reference. For example, slot 315 can include first reference 316 and second reference 318. First reference 316 can include a reference to a location where the sub-key represented by slot 315 is stored. In the example shown, slot 315 represents sub-key 210 of FIG. 2. Second sub-key 210 of key 204 can be a hexadecimal number ("05"). That number can be stored at location 320 in node 110. Location 320 has an offset (e.g., 1000) in number of bytes from the beginning of a memory page or disk page storing node 110. First reference 316 can include that offset (1000).

Second reference 318 of slot 315 can be a reference to a tuple in next SLA 310 that represents a left most child of the sub-key of slot 315. In the example shown, the SLA 310 is the next level SLA, which is an SLA one level lower than SLA 308. SLA 310 stores slots 321, 322 and 324. Slots 321 and 322 can represent sections of some key-value pairs (not shown) stored in node 110. Slot 324 can represent third sub-key 212 of key 204.

Slot 324 can have first reference 328 and second reference 330. First reference 328 can include a reference to a location in node 110 where a third level sub-key is stored. In the example shown, the third level sub-key includes third sub-key 212. Second reference 330 can point to a slot in the next level SLA that represents a left most child of sub-key 212.

SLA 311 is the lowest level SLA in slot table 116. SLA 311 includes an array of slots 332, 334 and 336. Each of slots 332, 334 and 336 can represent a fourth level sub-key. Slot 336 can represent the left most child of sub-key 212, and accordingly, referenced by reference 330 of slot 324. Each of slots 332, 334 and 336 can have a respective first reference indicating a location in node 110 where a corresponding sub-key is stored. Each of slots 332, 334 and 336 can have a respective second reference indicating a location in node 110 where a value is stored. For example, slot 336 can be a tuple having a second reference 338 pointing to location 342 where value 206 corresponding to key 204 is stored. Location 342 can be an offset ("3000").

A processor can use slot table 116 to search content in node 110. For example, upon receiving a query key, the processor can determine whether the query key is within range of keys represented in node 110. If the query key is not within range, the processor can search for the node corresponding to the query key from a root node. If the query key is within range, the processor can identify the value from values stored in node 110, or determine that no value corresponding to the query key exists.

To determine whether the query key is within range, the processor can perform a search in slot table 116, starting from first SLA 306. The processor can divide the query key into multiple sections each containing a sub-key, and then search SLAs 306, 308, 310 and 311, in that order, for each of the sub-keys. The search can be a binary search, because the slots are ordered in each SLA. The processor can look up the first sub-key in SLA 306, which is the first array of slot table 116, and which is for level one sub-keys. The processor can identify the level 1 sub-key in SLA 306 in a binary search. After the processor finds the first level sub-key, the processor can look up the index of the first child of the first level sub-key in the next level, which is SLA 308. The processor can then search the second level sub-key in SLA 308, starting from the left most child. The processor repeats the process until reaching the last level sub-key. Once the processor reaches the last level sub-key, the processor looks up its page offset to get the value for the key in the entirety.

Node 110 can be stored on disk and loaded into memory for modification. The processor can store node 110 in a memory structure which is accessed from another memory structure designated as a page frame after loading node 110 into memory. The page frame can include a flag indicating whether node 110 has changed. Upon determining that node 110 has changed, the processor can generate an in-memory slot table that corresponds to slot table 116. In the in-memory slot table, the SLAs of slot table 116 can be replaced by linked lists for more efficient addition and deletion. When the processor flushes node 110 from memory back to disk, the processor can convert the in-memory slot table back to slot table 116 from linked-list form to array form. The processor can then store the slot table 116, now back in array form, with other portions of node 110 to disk.

Anchor 122 can include a prefix and a suffix. The prefix can include a portion of a key that is represented at a higher level in the slot table. The prefix can be a sequence of one or more sub-keys. The suffix can include a portion of the key that is represented at a lower level in the slot table. The suffix can be a sequence of one or more sub-keys. For example, the prefix can include sub-keys 208, 210, 212 of FIG. 2. The suffix can include sub-key 214 of FIG. 2. The anchor can further include a page number and slot number of the prefix. The page number of the prefix can identify the node where the prefix is stored. The slot number of the prefix can identify a slot of slot table 116 where the prefix is represented. Anchor 122 can further include a page number and slot number of the suffix. The page number of the suffix can identify the node where the suffix is stored. The slot number of the suffix can identify a slot where the suffix is represented.

In some implementations, anchor 122 can be set on a non-leaf prefix. The suffix can point to one of the child sub-keys of the prefix. For example, anchor 122 can correspond to key 204. Anchor 122 can be set on prefix including sub-keys 208, 210 and 212 ("02.05.1D") and suffix including sub-key 214 ("FFEE").

The processor can lock node 110 and other nodes of tree data structure 100 when accessing a respective node. The processor can lock each node in a read lock or an exclusive lock. If locked by a read lock, node 110 is shared, and multiple processes can access node 110. If locked by an exclusive lock, node 110 is not shared.

Operations on tree data structure 100 can include key search, traversal of sub-trees of keys, sub-key insert, and delete of a sub-tree. In each case, the processor receives a query key including a prefix P and a suffix S. In key search, the processor can search for the query key and corresponding value in tree data structure 100. The processor can setup anchor 122 with the prefix P. Alternatively, the processor can reuse anchor 122 if anchor 122 is already set with the prefix.

In the key search, the processor can lock a node (e.g., node 110) that the page number of suffix S points to. The lock can be a read lock. The processor can then lookup slot table 116 for suffix S. Upon determining that the query key belongs to node 110, the processor can look up the corresponding value in node 110. If the value is found, the processor can then return the value after unlocking node 110. If the value is not found, the processor can designate the query key as not found. Upon determining that the query key does not belong to node 110, the processor can unlock node 110 and start a top-down traversal of tree data structure 100.

In the top-down traversal, the processor can lock root node 102 of tree data structure 100 in a read lock. The processor can look up a child node number for the query key by searching in slot table 124 of node 102. The processor can lock the child node in a read lock and unlock root node 102. The processor can iterate through the levels of tree data structure 100 until reaching a leaf node. The processor can then perform operations described in the previous paragraph in the leaf node.

In a sub-tree traversal, the processor can traverse a sub-tree of hierarchical key structure 220. An anchor can be set on an internal node (N1) of hierarchical key structure 220. The prefix P1 of the anchor is set to the internal node I1 of hierarchical key structure 220. The suffix S1 of the anchor is set to the first child of node I1. The traversal can be from left to right or from the right to left.

In a left-to-right traversal, the processor can execute a procedure getNext( ) to traverse child sub-keys of the prefix P1 by iterating through sub-keys of the prefix from one child of the prefix P1 to a next child of the prefix P1. The processor can lock the node N1 in tree data structure 100. If the next child sub-key is not in the node N1, the processor can release the read lock and start a top-town traversal of tree data structure 100 as described above.

The processor can determine that the next child sub-key is still in the node N1. The processor can look up in node N1 for a next sub-key that is located in a same SLA as the slot of suffix S1. If the processor finds the suffix S1, the processor can access the corresponding value. If the processor does not find the suffix S1, the processor can lock a next node N2 in tree data structure 100, and unlock node N1.

The processor can determine that within node N1, in the SLA corresponding to the suffix S, the sub-key represented by last data tuple is not marked as an EH. In response, the processor can perform a top-down search from root node 102 of tree data structure 100 to look for <prefix P>.<suffix>.EH. This is because <prefix P>.<suffix S> can be a root node of a sub-tree in hierarchical key structure 220. The sub-tree in hierarchical key structure 220 can span multiple nodes of tree data structure 100. By moving to the last child, the processor can skip over the nodes to reach the end of the sub-tree in hierarchical key structure 220 so as to move to the next sub-key. The processor can continue to look at the next sub-key at the same level until the process finds the suffix S1.

Likewise, in a right-to-left traversal, the processor can traverse child sub-keys of the prefix P1 by iterating through sub-keys of the prefix from one child of the prefix P1 to a previous child of the prefix P1. The processor can perform the right-left traversal by executing a getPrev( ) procedure. The processor can lock the page pointed by the current suffix S1 using a read lock. If the suffix S1 is not in the same node, the processor can release the page lock and start a top-down tree traversal to search for the key <prefix P1>.<suffixS1>. Otherwise, the processor can execute the following steps. Once in the current leaf node for suffix S1, the processor can look for the previous sub-key at the same level as the current sub-key. If the previous sub key exists, then the operation is successful and the processor releases the lock. Otherwise, the processor attempts a non-blocking read lock on the previous leaf node. If the lock succeeds, then the processor searches for the previous sub-key in the previous node. If the attempt to lock fails, the processor starts a top-down traversal of tree data structure 100 to search for key <prefix P1>.BH. The processor then starts a left to right traversal of the leaf nodes of tree data structure 100 looking for key <prefixP1>.<suffix S1> while also maintaining the biggest previous sub-key at the same level. When the processor reaches the leaf node containing the key <prefix P1>.<suffix S1>, the biggest previous node contains the prefix sub-key that it is looking for. Also, the processor can skip a sub-tree that spans multiple nodes by performing a top-down search from root node 102 of tree data structure 100 to look for <prefix P>.<suffix>.BH instead of <prefix P>.<suffix>.EH.

In sub-key insert, the processor can insert a sub-key as a child of prefix P of anchor at (prefix P, suffix S). The processor can optionally insert a value. The processor can lock a node pointed to by the page number of suffix S in an exclusive lock. Upon determining that (1) the new sub-key is in range of sub-keys of the node and belongs to the node N, and (2) the node has sufficient amount of free space for the new sub-key, the processor can add the sub-key to the node and release the lock. Upon determining the at least one of conditions (1) and (2) above is not satisfied, the processor can lock a next node N1, which can be a sibling of node N that shares a same parent with node N. The lock can be an exclusive lock. The processor can determine whether node N1 has sufficient free space to store one or more keys from node N to make room for the new sub-key.

Upon determining that node N1 has sufficient free space, the processor can transfer the one or more keys from node N to node N1 and insert the new sub-key into node N. Upon determining that node N1 does not have sufficient free space, the processor can traverse tree data structure 100 structure from root node 102 using the following techniques. The processor can lock the root of the tree in an exclusive lock. The processor can find the child node corresponding to the key in question and lock that child node in exclusive mode. The processor can continue traversing the tree until reaching a leaf node. In the top-down traversal, if an internal node has enough free space to store an extra page split, the processor can release all previous exclusive locks of parent nodes.

The processor can perform sub-key delete operations using similar techniques as sub-key insert operations. Given an anchor at (prefix P, suffix S), the processor can delete suffix S and its corresponding value where suffix S is a child of prefix P. The processor can lock a node pointed to by the page number of S. Upon determining that (1) suffix S is still in the node and (2) the deletion does not trigger a merge, the processor can delete the key and value and release the lock.

Upon determining that at least one of conditions (1) and (2) above is not satisfied, the processor can start a top-down traversal of tree data structure 100, starting by exclusively locking the root node. The processor can find the child node corresponding to the key in question and lock that child node in exclusive mode. The processor can continue traversing the tree until reaching a leaf node. In the top-down traversal, if an internal node is safe from merger, the processor can release all previous exclusive locks of parent nodes of the index node.

Exemplary Processes

Figure 4:
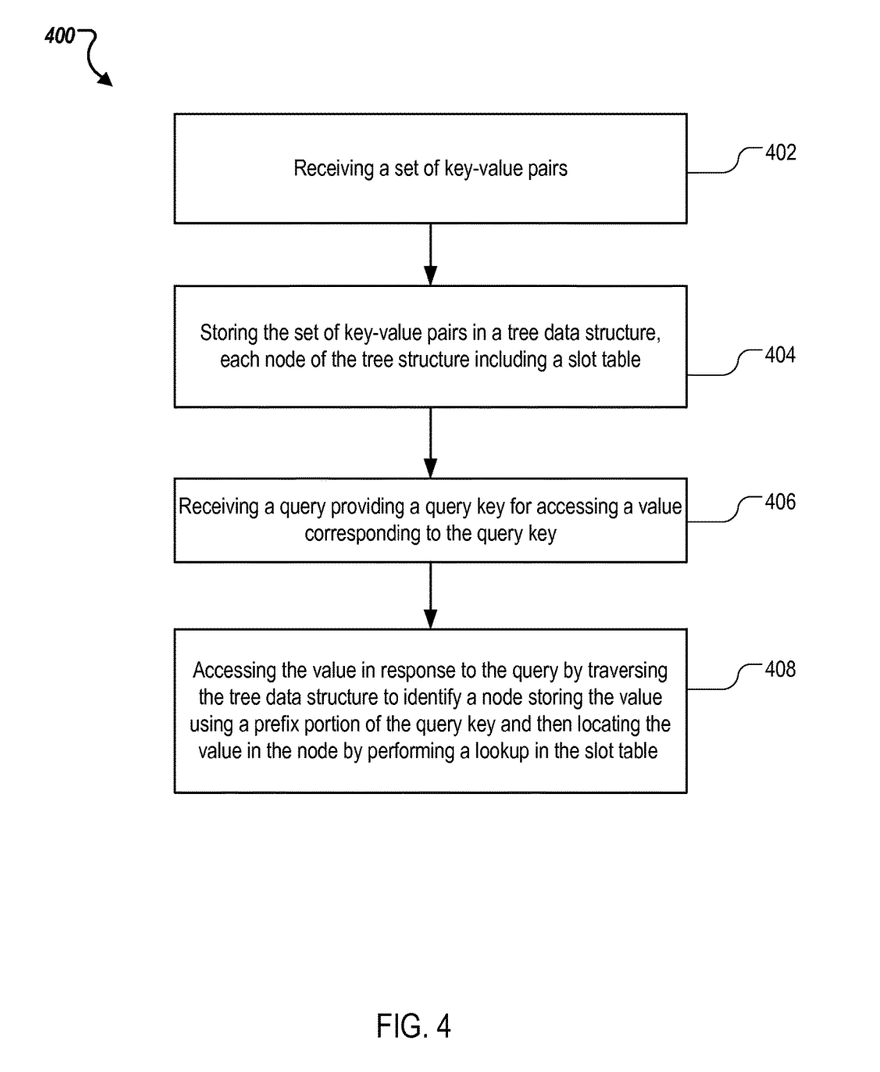
FIG. 4 is a flowchart of an example process of key compression.

FIG. 4 is a flowchart of example process 400 of key compression. Process 400 can be performed by one or more computer processors.

A processor can receive (402) a set of key-value pairs. Each key-value pair can include a key associated with a value. The set of key-value pairs can be content in an operating system file or a database file. Each key can include multiple sub-keys each located at a respective sub-key level in the key. Each sub-key can be a portion of the key. Each sub-key level can correspond to a location of a corresponding portion of the key. A portion of the key that is located to the left has a higher sub-key level than a portion of the key that is located next to the right. The portion of the key that is located next to the right can be designated as a child sub-key of the portion of the key that is located to the left.

The processor can store (404) the set of key-value pairs in a tree data structure including internal nodes and leaf nodes. The tree data structure can have tree levels that are different from the sub-key levels. The tree data structure is a B+ tree. Each leaf node can store one or more key-value pairs of the set of key-value pairs. In each node, one or more sub-keys are compressed. In each leaf node, the one or more keys of the one or more key-value pairs stored in the leaf node are compressed. The one or more keys are indexed in a slot table in the leaf node. The slot table can have SLAs corresponding to the sub-key levels. Each SLA of the slot table can include one or more elements designated as slots. Each slot can be a data tuple corresponding to a sub-key of a key-value pair stored in a node in which the slot table is located.

Each data tuple can include a first reference to a location of the corresponding sub-key in the node. Each data tuple can include a second reference to a location of a child sub-key. Each sub-key can be stored and referenced once in each node. The one or more slots can be stored in SLAs on disk. When the value is updated, the node can be loaded from disk to memory. A modification of the value in memory can trigger a conversion of each SLA into a respective linked list. A subsequent flush of the modified value from the memory to disk can trigger a conversion of each linked list into a respective SLA.

The processor can receive (406) a query providing a query key for accessing a value corresponding to the query key. The query can be a database query. The query key can be generated from the database query.

The processor can access (408) the value in response to the query by traversing the tree data structure to identify a leaf node storing the value using the slot tables in the internal nodes and leaf nodes. The processor can traverse the tree data structure using a first portion of the query key. The first portion can be a prefix including one or more sub-keys. The processor can then locate the value in the leaf node by performing a lookup in the slot table using a second portion of the query key at a second sub-key level.

Figure 5:
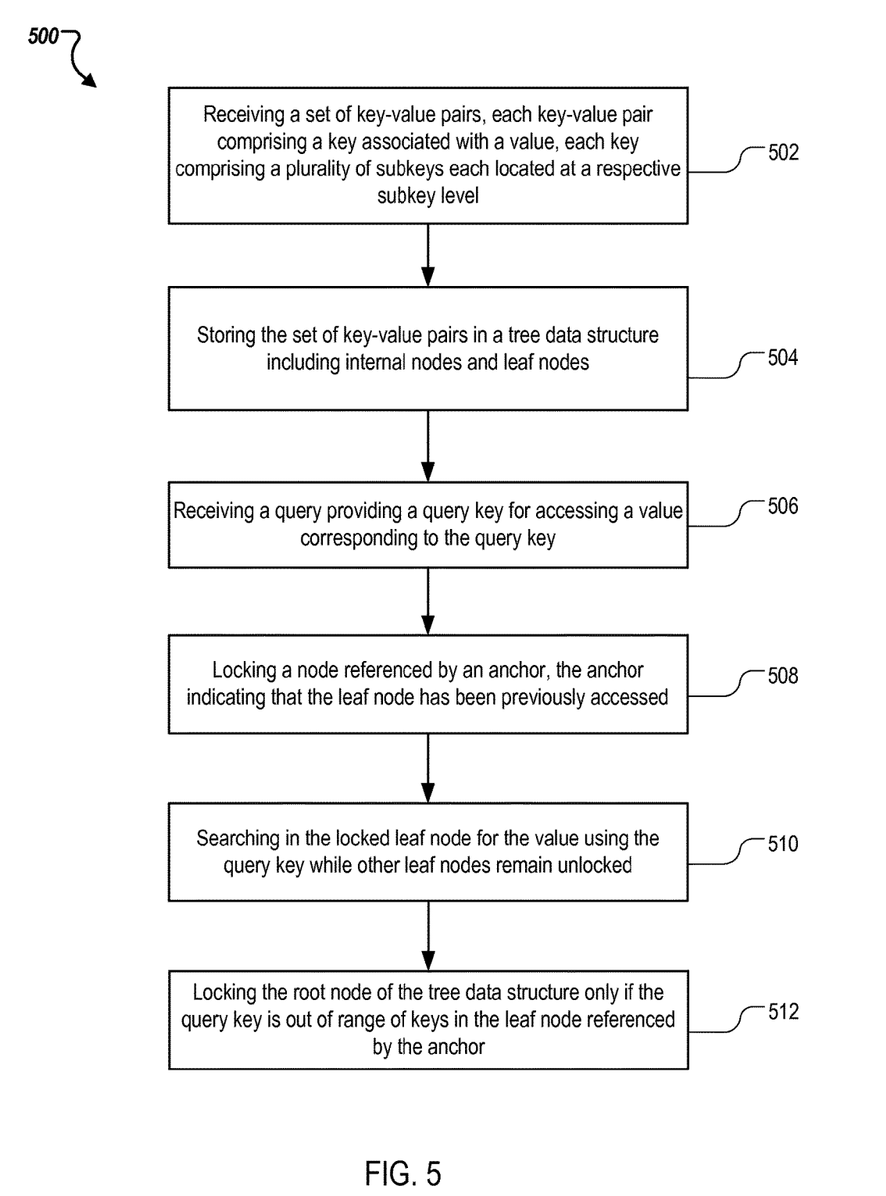
FIG. 5 is a flowchart of example process of cached locking.

FIG. 5 is a flowchart of example process 500 of cached locking. Process 500 can be performed by one or more computer processors.

A processor can receive (502) a set of key-value pairs. Each key-value pair can include a key associated with a value. The set of key-value pairs can be content in an operating system file or a database file. Each key can include multiple sub-keys each located at a respective sub-key level.

The processor can store (504) the set of key-value pairs in a tree data structure including internal nodes and leaf nodes. The tree data structure is a B+ tree. The tree data structure has tree levels that are different from the sub-key levels. Each leaf node can store one or more key-value pairs of the set of key-value pairs.

The processor can receive (506) a query providing a query key for accessing a value corresponding to the query key. The query can be a database query. The query key can be generated from the database query. Accessing the value can include adding content to the value, modifying content to the value, or deleting content from the value. Adding the value can cause a split of one or more nodes in the tree data structure. The split can occur only upon determining, by the processor, that free space in the node is insufficient for adding the content. The amount of free space can be stored in a header of the leaf node.

Before locking the root node of the tree data structure to search for the value corresponding to the query key, the processor can lock (508) a node referenced by an anchor. The anchor can indicate that the node has been previously accessed. The referenced node can be a leaf node or an internal node.

The processor can search (510) in the locked leaf node for the value using the query key while other leaf nodes remain unlocked. Searching for the value using the query key can include searching a slot table of the locked node. The slot table of the locked node can index compressed keys stored in the locked node.

The processor can lock (512) the root node of the tree data structure only upon determining that the query key is out of range of keys in the node referenced by the anchor.

Exemplary System Architecture

Figure 6:
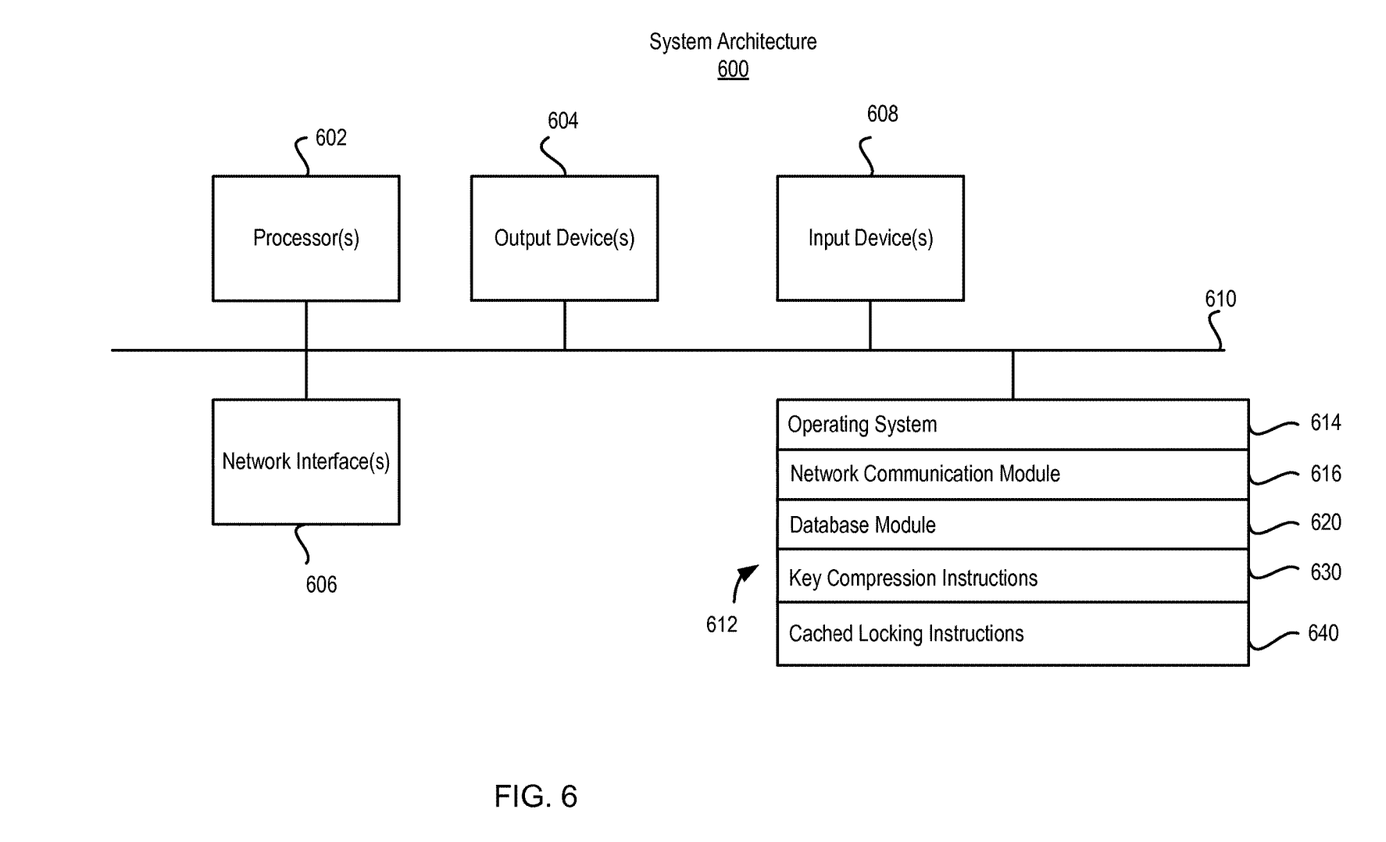
FIG. 6 is a block diagram illustrating an example system implementing the features and operations described in reference to FIGS. 1-5.

FIG. 6 is a block diagram of an exemplary system architecture for implementing the features and operations of FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to a medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., a Linux® operating system), network communication module 616, database module 620, key compression instructions 630 and cached-locking instructions 640. Operating system 614 can be multi-user, multi-processing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.).

Database module 620 can include computer instructions that, when executed, cause processor 602 to perform operations of a database system, including generating keys and sub-keys from database statements. Key compression instructions 630 can include computer instructions that, when executed, cause processor 602 to perform functions of key compression, including generating and searching a slot table. Cached-locking instructions 640 can include computer instructions that, when executed, cause processor 602 to perform cached-locking operations when traversing a tree data structure.

Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method for managing a database, the method comprising, at a computing device:
  receiving a key-value pair that comprises a key and a value, wherein:
    the key includes at least a first sub-key and a second sub-key, the first and second sub-keys are associated with first and second levels, respectively, within a sub-key hierarchy, and
    the first and second sub-keys have first and second values, respectively;
  compressing and indexing the first and second sub-keys by:
    storing respective references to the first and second sub-keys in first and second slot level arrays of a slot table, wherein:
      the slot table is included in a node of a tree data structure, and
      the first and second slot level arrays correspond to the first and second levels, respectively, of the sub-keys; and
    storing, in the second slot level array, a reference to the value;
  storing, in the node, the key and the value, wherein:
    the tree data structure includes a plurality of nodes, and
    the tree data structure is organized into tree levels that are different from the first and second levels within the sub-key hierarchy; and
  in response to receiving a query that includes a query key that corresponds to the key of the key-value pair:
    analyzing the query key against a respective slot table of at least one node of the plurality of nodes of the tree data structure to identify the node that stores the key and the value, and
    returning the value stored in the node.

2. The method of claim 1, wherein the key-value pair is content in an operating system file or a database file, and the tree data structure is a B+ tree.

3. The method of claim 1, wherein
  the first and second sub-keys are portions of the key,
  the first sub-key is located to the left of the second sub-key within the key,
  the second sub-key is designated as a child sub-key of the first sub-key,
  the first and second levels associated with the first and second sub-keys, respectively, correspond to a location within the key of the first sub-key in relation to the second sub-key, and
  the first level is designated as higher than the second level.

4. The method of claim 1, wherein:
  the first slot level array comprises a first data tuple corresponding to the first sub-key,
  the first data tuple includes:
    a first reference to a location of the first sub-key in the node, and
    a second reference to a child data tuple associated with a left most child of the first sub-key,
  the second slot level array comprises the child data tuple and a second data tuple corresponding to the second sub-key,
  the second data tuple includes:
    a third reference to a location of the second sub-key in the node, and
    a fourth reference to a location of the value in the node.

5. The method of claim 4, wherein the first and second slot level arrays are stored in memory, and the method further comprises:
  detecting that the value in memory has been modified; and then
  converting the first and second slot level arrays into respective linked lists;
  detecting a subsequent flush of the value from the memory to disk; and then
  converting the respective linked lists into respective slot level arrays.

6. The method of claim 4, wherein the first and second sub-keys are stored and referenced once in each of the plurality of nodes.

7. A method comprising:
  receiving a key-value pair that comprises a key and a value, wherein:
    the key includes at least a first sub-key and a second sub-key, the first and second sub-keys are associated with first and second levels, respectively, within a sub-key hierarchy, and the first and second sub-keys have first and second values, respectively;

storing, in a node of a tree data structure, the set of key-value pair, wherein:

the tree data structure includes a plurality of nodes, and
the tree data structure is organized into tree levels that are different from the first and second levels within the sub-key hierarchy;

in response to receiving a query that includes a query key that corresponds to the key of the key-value pair:

before locking a root node of the plurality of nodes:
analyzing the query key against an anchor to identify the node that stores the key, wherein the anchor indicates the node has been previously accessed by including:
a prefix that comprises the first sub-key, and
a reference to the node;
locking the value-using node;
analyzing the query key against a slot table of the node to determine that the node stores the key and the value; and
returning the value stored in the node, while other nodes of the plurality of nodes remain unlocked.

8. The method of claim 7, wherein the key-value pair is content in an operating system file or a database file, the tree data structure is a B+ tree.

9. The method of claim 7, wherein:
the anchor comprises the prefix and a suffix,
the prefix includes a portion of the key that is represented at a higher level in the slot table of the node, wherein:
the slot table comprises a first slot level array and a second slot level array that correspond to the first and second levels, respectively of the first and second sub-keys,
the first slot level array is designated at a higher level with respect to the second slot level array,
the suffix includes a portion of the key that is represented at the second slot level array in the slot table,
the prefix further comprises:
a prefix page number that identifies the node, and
a prefix slot number corresponding to a slot within the slot table that corresponds to the prefix; and
the suffix further comprises:
a page number that identifies the node, and
a suffix slot number corresponding to a different slot within the slot table that corresponds to the suffix.

10. The method of claim 7, further comprising:
receiving content to add to the value;
determining that an insufficient amount of free space is in the node to store the content; and
causing the node to split in the tree data structure.

11. The method of claim 7, further comprising:
receiving a second query that includes a second query key that corresponds to a second key associated with a second key-value pair;
analyzing the query key against the anchor to determine the second query key is out of range of the keys in the node; and
locking the root node of the tree data structure; and
analyzing the second query key against a respective slot table of at least one node of the plurality of nodes of the tree data structure to identify a second node that stores the second key and a value; and returning a second value associated with the second key and stored in the second node.

12. A system, comprising:
a processor; and
a non-transitory computer-readable storage medium storing instructions that, when executed by the processor, cause the processor to:
receive a key-value pair that comprises a key and a value, wherein:
the key includes at least a first sub-key and a second sub-key,
the first and second sub-keys are associated with first and second levels, respectively, within a sub-key hierarchy, and
the first and second sub-keys have first and second values, respectively;
compress and index the first and second sub-keys by:
storing respective references to the first and second sub-keys in first and second slot level arrays of a slot table, wherein:
the slot table is included in a node of a tree data structure, and
the first and second slot level arrays correspond to the first and second levels, respectively, of the sub-keys; and
storing, in the second slot level array, a reference to the value;
store, in the node, the key and value, wherein:
the tree data structure includes a plurality of nodes, and
the tree data structure is organized into tree levels that are different from the first and second levels within the sub-key hierarchy; and
in response to receiving a query that includes a query key that corresponds to the key of the key-value pair:
analyze the query key against a respective slot table of at least one node of the plurality of nodes of the tree data structure to identify the node that stores the key and the value, and
return the value stored in the node.

13. The system of claim 12, wherein the key-value pair is content in an operating system file or a database file, the tree data structure is a B+ tree.

14. The system of claim 12, wherein
the first and second sub-keys are portions of the key,
the first sub-key is located to the left of the second sub-key within the key,
the second sub-key is designated as a child sub-key of the first sub-key,
the first and second levels associated with the first and second sub-keys, respectively, correspond to a location within the key of the first sub-key in relation to the second sub-key, and
the first level is designated as higher than the second level.

15. The system of claim 12, wherein:
the first slot level array comprises a first data tuple corresponding to the first sub-key,
the first data tuple includes:
a first reference to a location of the first sub-key in the node, and
a second reference to a child data tuple associated with a left most child of the first sub-key,
the second slot level array comprises the child data tuple and a second data tuple corresponding to the second sub-key, the second data tuple includes:
a third reference to a location of the second sub-key in the node, and
a fourth reference to a location of the value in the node.

16. The system of claim 15, wherein the first and second slot level arrays are stored in memory, and the instructions further cause the processor to:
detect that the value in memory has been modified; and then
convert the first and second slot level arrays into respective linked lists;
detect a subsequent flush of the value from the memory to disk; and then
convert the respective linked lists into respective slot level arrays.

17. A non-transitory computer-readable storage medium storing instructions that, when executed by a processor, cause the processor to:
receive a key-value pair that comprises a key and a value, wherein:
the key includes at least a first sub-key and a second sub-key, and
the first and second sub-keys are associated with first and second levels, respectively, within a sub-key hierarchy, and
the first and second sub-keys have first and second values, respectively;
index the first and second sub-keys by:
storing respective references to the first and second sub-keys in first and second slot level arrays of a slot table, wherein:
the slot table is included in a node of a tree data structure, and
the first and second slot level arrays correspond to the first and second levels, respectively, of the sub-keys; and
storing a reference to the value in the second slot level array;
store, in the node, the key and the value, wherein:
the tree data structure includes a plurality of nodes, and
the tree data structure is organized into tree levels that are different from the first and second levels within the sub-key hierarchy; and
in response to receiving a query that includes a query key that corresponds to the key of the key-value pair:
analyze the query key against a respective slot table of at least one node of the plurality of nodes of the tree data structure to identify the node that stores the key and the value, and
return the value stored in the node.

18. The non-transitory computer-readable storage medium of claim 17, wherein the key-value pair is content in an operating system file or a database file, the tree data structure is a B+ tree.

19. The non-transitory computer-readable storage medium of claim 17, wherein:
the first and second sub-keys are portions of the key,
the first sub-key is located to the left of the second sub-key within the key,
the second sub-key is designated as a child sub-key of the first sub-key,
the first and second levels associated with the first and second sub-keys, respectively, correspond to a location within the key of the first sub-key in relation to the second sub-key, and
the first level is designated as higher than the second level.

20. The non-transitory computer-readable storage medium of claim 17, wherein:
the first slot level array comprises a first data tuple corresponding to the first sub-key,
the first data tuple includes:
a first reference to a location of the first sub-key in the node, and
a second reference to a child data tuple associated with a left most child of the first sub-key,
the second slot level array comprises the child data tuple and a second data tuple corresponding to the second sub-key,
the second data tuple includes:
a third reference to a location of the second sub-key in the node, and
a fourth reference to a location of the value in the node.

21. The non-transitory computer-readable storage medium of claim 20, wherein the first and second slot level arrays are stored in memory, and the instructions further cause the processor to:
detect that the value in memory has been modified; and then
convert the first and second slot level arrays into respective linked lists;
detect a subsequent flush of the value from the memory to disk; and then
convert the respective linked lists into respective slot level arrays.

22. The non-transitory computer-readable storage medium of claim 20, wherein the first and second sub-keys are stored and referenced once in each of the plurality of nodes.

* * * * *

UNITED STATES PATENT AND TRADEMARK OFFICE
CERTIFICATE OF CORRECTION

PATENT NO. : 10,303,673 B2
APPLICATION NO. : 14/833015
DATED : May 28, 2019
INVENTOR(S) : Vemulapati et al.

Page 1 of 1

It is certified that error appears in the above-identified patent and that said Letters Patent is hereby corrected as shown below:

In the Claims

In Claim 3, at Column 14, Line 22: "method of claim 1, wherein" should read -- method of claim 1, wherein: --.

In Claim 7, at Column 14, Line 63: "A method comprising:" should read -- A method, comprising: --.

In Claim 7, at Column 15, Lines 6-7: "the set of key-value pair," should read -- the key-value pair, --.

In Claim 7, at Column 15, Line 21: "locking the value-using node;" should read -- locking the node; --.

In Claim 14, at Column 16, Line 45: "system of claim 12, wherein" should read -- system of claim 12, wherein: --.

Signed and Sealed this
Thirty-first Day of December, 2019

Andrei Iancu
*Director of the United States Patent and Trademark Office*